United States Patent [19]
Hart et al.

[11] Patent Number: 6,041,182
[45] Date of Patent: *Mar. 21, 2000

[54] AUTOMATIC INVOCATION OF COMPUTATIONAL RESOURCES WITHOUT USER INTERVENTION

[75] Inventors: Peter Hart, Menlo Park; Jamey Graham, San Jose, both of Calif.

[73] Assignees: Ricoh Company Ltd, Tokyo, Japan; Ricoh Corporation, Menlo Park, Calif.

[ * ] Notice: This patent is subject to a terminal disclaimer.

[21] Appl. No.: 08/653,601

[22] Filed: May 24, 1996

Related U.S. Application Data

[63] Continuation of application No. 08/034,458, Mar. 19, 1993, Pat. No. 5,546,502.

[51] Int. Cl.[7] ................................................ G06F 9/445
[52] U.S. Cl. ........................................ 395/712; 395/705
[58] Field of Search .................................. 395/702, 704, 395/709, 712, 163, 705; 702/82, 183; 710/8; 364/468.15; 706/11

[56] References Cited

U.S. PATENT DOCUMENTS

| | | | |
|---|---|---|---|
| 4,589,063 | 5/1986 | Shah et al. | ................................... 710/8 |
| 4,954,964 | 9/1990 | Singh | ......................................... 395/12 |

(List continued on next page.)

FOREIGN PATENT DOCUMENTS

| | | |
|---|---|---|
| 0 436 459 A1 | 11/1990 | European Pat. Off. . |
| 0 407 296 A1 | 1/1991 | European Pat. Off. . |
| 0 616 288 A2 | 9/1994 | European Pat. Off. . |
| WO-92 02880 | 2/1992 | WIPO . |

OTHER PUBLICATIONS

Hopfield et al., "Neural computation of decisions in optimization problems", Biological Cybernetics, pp. 141–152, Feb. 1985.

Moore et al., "Characterizing the error funcation of a neural network", IEEE, 1988, pp. 49–57, 1988.

Korel et al., "Assertion oriented automated test data generation", IEEE, Proc. of ICSE–18, pp. 71–80, 1996.

Venkatesh, " Computer & other interactive technologies fro the home", Comm. of the ACM, vol. 39, No. 12, pp 47–54, Dec. 1996.

Chen et al, "A knowledge based approach to the design of document based retrival system", ACM, pp 281–290, Feb. 1990.

Shibata et al, "Dynamic hypertext and Knowledge agent system fro multimedia infromation networks", Hypertext Proceedings, pp. 82–93, Nov. 1993.

Yoëlle S. Maarek, et al., An Information Retrieval Approach for Automatically Contstructing Software Libraries, IEEE Transactions on Software Engineering, vol. 17, No. 8, Aug. 1991.

Bellazzi, et al., GAMEES II An Environment for Building Probabilistic Expert Sys Based on Arrays of Bayesian Belief Networks, 14–17, Jun. 1992.

"Walk The Talk, Targeted Advertising", Bits & Pixels: Targeted Advertising, www.bitpix.com/business/main/walk-talk/tad/tad.htm.

*Primary Examiner*—Tariq R. Hafiz
*Assistant Examiner*—Anil Khatri
*Attorney, Agent, or Firm*—Townsend and Townsend and Crew LLP

[57] ABSTRACT

A system is described for automatically invoking computational resources without intervention or request from a user of the system. In the system a query-free information retrieval system is described in which the exact technical documentation contained in existing user or other technical manuals is provided to a user investigating apparatus having a fault. The user enters symptoms based upon the user's analysis of the apparatus, and in response the system provides information concerning likely faults with the apparatus. As the symptoms are entered, the relative value of individual faults is determined and related to the symptoms they cause. The user can then select technical information relating to probable faults in the system.

44 Claims, 9 Drawing Sheets

U.S. PATENT DOCUMENTS

| | | | |
|---|---|---|---|
| 5,067,099 | 11/1991 | McCown et al. | 702/183 |
| 5,099,436 | 3/1992 | McCown et al. | 702/82 |
| 5,103,498 | 4/1992 | Lanier et al. | 395/68 |
| 5,159,685 | 10/1992 | Kung . | |
| 5,172,313 | 12/1992 | Schumacher . | |
| 5,263,126 | 11/1993 | Chang | 395/12 |
| 5,367,473 | 11/1994 | Chu et al. . | |
| 5,418,888 | 5/1995 | Alden . | |
| 5,432,932 | 7/1995 | Chen et al. . | |
| 5,475,695 | 12/1995 | Caywood et al. | 364/468.15 |
| 5,485,615 | 1/1996 | Wennmyr | 395/702 |
| 5,499,343 | 3/1996 | Pettus . | |
| 5,535,323 | 7/1996 | Miller et al. . | |
| 5,546,502 | 8/1996 | Hart et al. | 706/11 |
| 5,563,805 | 10/1996 | Arbuckle et al. . | |
| 5,628,011 | 5/1997 | Ahamed et al. . | |
| 5,638,504 | 6/1997 | Scott et al. | 707/530 |
| 5,732,212 | 3/1998 | Perholtz et al. | 395/712 |
| 5,793,933 | 8/1998 | Iwamasa | 706/45 |

AUTOMATIC INVOCATION OF COMPUTATIONAL RESOURCES WITHOUT USER INTERVENTION

This is a continuation of application Ser. No. 08/034,458 filed Mar. 19, 1993, now U.S. Pat. No. 5,546,502.

BACKGROUND OF THE INVENTION

This invention relates to expert systems, and in particular to a system in which computational resources are invoked by a user without direct intervention.

The increasing use of expert systems as diagnostic tools in service industries has established that knowledge embedded systems can provide quality expertise within defined domains. Most prior systems, however, do not appreciate the usefulness of technical documentation as a resource for human experts when performing diagnostic tasks. On-line technical manuals can aid the user by greatly enhancing the potential for success. Typical prior art systems which do recognize this asset simply provide interfaces for browsing on-line documentation in a "help text" format. This documentation, however, is usually the result of experts and developers rewriting, in an abbreviated form, the content of technical manuals. The exact technical documentation contained in the manuals, and used by most technicians in the field, is not provided. By rewriting the documentation, the experts and developers increase the time to develop a system, and decrease the original content. Because the documentation does not rely on the actual manuals, which are maintained independently, the life cycle costs of maintaining this "help text" documentation is high.

Some help systems have relied on expert systems to add "intelligence" to the help system. One such prior art system is described in U.S. Pat. No. 5,103,498, entitled "Intelligent Help System." In that system a monitoring device "watches" the system-user interface and determines what monitoring information to store. This information, together with the physical state of the system, is stored in a knowledge base. An inference engine tests rules against the knowledge base data to generate help text. Unfortunately, in this system the user must request help, and that help is supplied as help text.

A system applied specifically to the medical information field provided a method of automatic information retrieval by evaluating the observed manifestations and possible diagnosis. It then provided access to relevant medical texts. The system is described in P. L. Elkin, et al., "Closing the Loop on Diagnostic Decision Support Systems," 14*th Annual Symposium on Computer Applns. in Medical Care*, Standards in Medical Informatics, Washington, D.C. (Nov. 1990), IEEE Computer Soc. Press. Unfortunately, the technical details of the system are still unclear.

Furthermore, in many prior art systems computational resources typically were, in a sense, turned "on" and "off" by the user. By this we mean that the user decided when to process particular information to determine interrelationships among all of the entered information. In such systems users are unaware of all of the capabilities of the system and thus often overlook valuable computational resources.

SUMMARY OF THE INVENTION

We have developed a system which automatically invokes external computational resources without user intervention. In our system a base application, typically a computer program, is used interactively by an individual. As use progresses, a variety of internal calculations are performed based upon information entered by the user. When these calculations determine that additional information could be of benefit to the user based on the information entered, then the availability of that additional information is made known to the user. If the user desires the additional information, it can be displayed for review. Alternatively, the user can continue with analysis, reserving a review of the additional information for later. Preferably, in our system a belief network is employed to enable probabilistic or other determinations to be made of the likely importance of the information available.

In a preferred system, according to our invention we employ an information retrieval method which, unlike prior systems, uses the exact technical documentation contained in the existing user or other technical manuals. It does not require the user to know of the existence of information to receive it. Furthermore, our system does not simply offer on-line access to help text, but instead provides contextual pointers (based on the context of the expert system) to the user manual documentation. Whereas most on-line information access systems require the user to enter a search query and request processing of that query when searching for relevant information, our system does not. The availability of relevant information is provided automatically or "query-free" as the user works on a diagnostic problem. This is achieved by evaluating the context of the diagnostic session and automatically accessing the appropriate technical documentation. No time is lost by the user having to stop to search for relevant documentation; the documentation is simply waiting to be used. Additionally, the text provided when it is requested is that of the user manuals—text with which the user is already familiar. Any updates to the hard copy documentation can be electronically uploaded into our system, so the hard copy and electronic copy of the manual are always consistent. The actual search and retrieval process does not introduce delays because it is performed off-line, during development, before the user ever uses the system.

In a preferred embodiment, an information retrieval system which employs our invention includes a computing system in which is stored documentation relating to the apparatus to be investigated as well as probabilistic information relating individual symptoms to faults in the apparatus which may cause such symptoms. The user of the system employs some means of data entry, typically a keyboard to select from a menu on a screen, to allow the user to enter symptoms concerning the apparatus being investigated. In response, the system calculates probabilities of the individual faults as indicated by the symptoms they cause. The possible faults are displayed, and the user is given an opportunity to select documentation related to the possible faults.

DESCRIPTION OF THE SPECIFIC EMBODIMENTS

Figure 1:
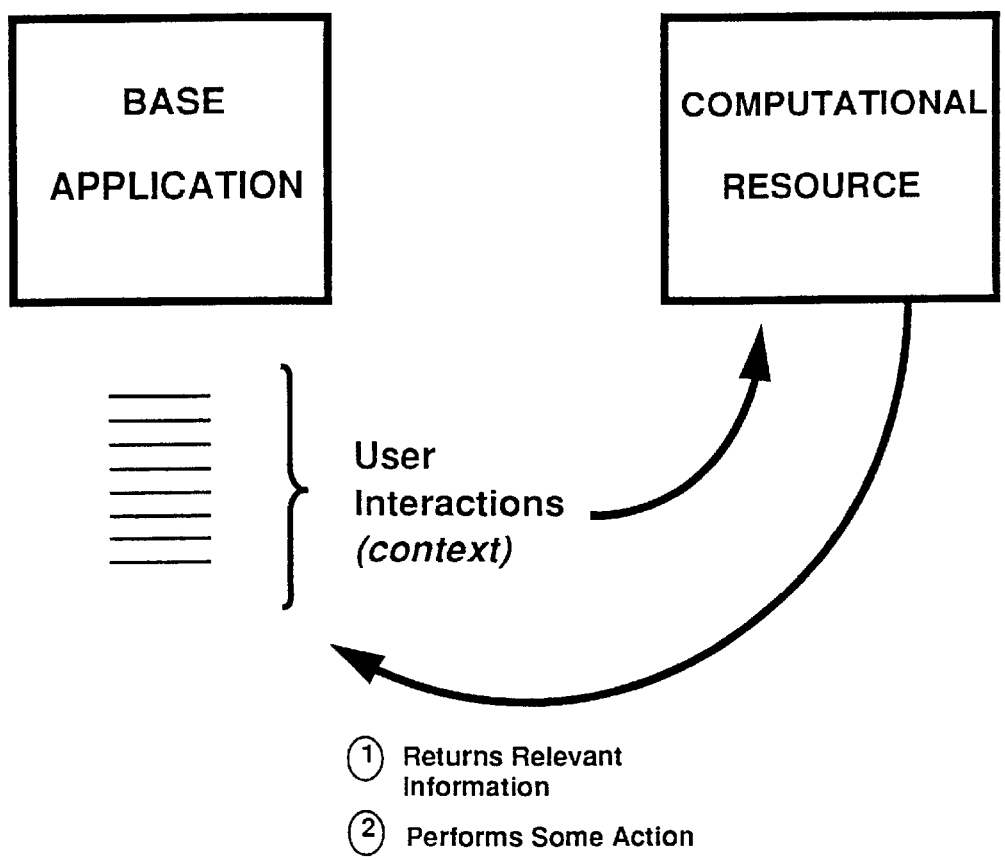
FIG. 1 is a diagram representing the relationship of a computational resource and a base application.

FIG. 1 is a diagram representing the relationship between a base application and a computational resource in one embodiment of our system. The base application typically will consist of an application operating on a computer system, for example, an expert system, a belief network, or other computer program. The computational resource typically will be an information retrieval system, a database or other possible provider of useful information or a performer of some function. In our system the external computational resources are automatically invoked without specific user intervention.

Preferably as use of the base application progresses interactively, internal calculations are made based upon the input information entered by the user. When these calculations determine that further information could be of benefit to the user, then the availability of that further information is made known. In effect the user interactions have established a context by which the computational resource can return relevant information or perform actions. Because, in the preferred embodiment, the availability of the information is only made known to the user, as opposed to being displayed to him, the user can choose to continue with the analysis or project, reserving a review of the information until later.

Preferably, our system functions in the probabilistic expert system environment known as belief networks. The use of belief networks for assessing one's belief about a set of circumstances is a technique which has gained popularity in the last few years in the field of expert systems. The technique represents an expert's knowledge by assigning a conditional probability to the relationship between a symptom and a fault, or more generally between a cause and an effect. In such systems, by evaluating when or how a symptom occurs with respect to all possible faults which can cause it, the expert system can provide a probabilistic assessment of this relationship. For example, if the relationship between the symptom "streaky copy" and the fault "toner clutch failure," is "strong" then the likelihood (probability) is high that this fault is present once this symptom is observed. In a belief network environment, experts and developers assign probabilistic values to the relationship which exists between each individual symptoms and all faults F, i.e., $P(S_1|F_1, F_2, \ldots, F_n)$. At runtime, these probabilities are inverted using Bayes' rule to represent a fault with respect to the symptoms it causes, e.g., $P(F_1|S_1, S_2, \ldots, S_n)$. Thus, as a user observes and enters known symptoms, the relative value of the individual faults which are supported by these symptoms goes up, eliminating irrelevant faults from the overall diagnosis.

The structure of the belief network in our system is represented by symptoms or observed features connected to the faults or hypotheses which cause them. These network nodes (both symptoms and faults) provide the content for the information retrieval system. The software we use in the preferred embodiment to achieve this relationship is known as DXpress and is commercially available from Knowledge Industries, Palo Alto, Calif.

Although here we use the terms "fault" and "symptom," it should be understood they are used solely for explanation. Other equivalent terminology may be readily employed, for example, condition and manifestation, state of nature and observation, etc. The use of fault and symptom is particularly convenient because in the preferred embodiment our system is used by repair technicians to diagnose and repair apparatus.

Figure 2:
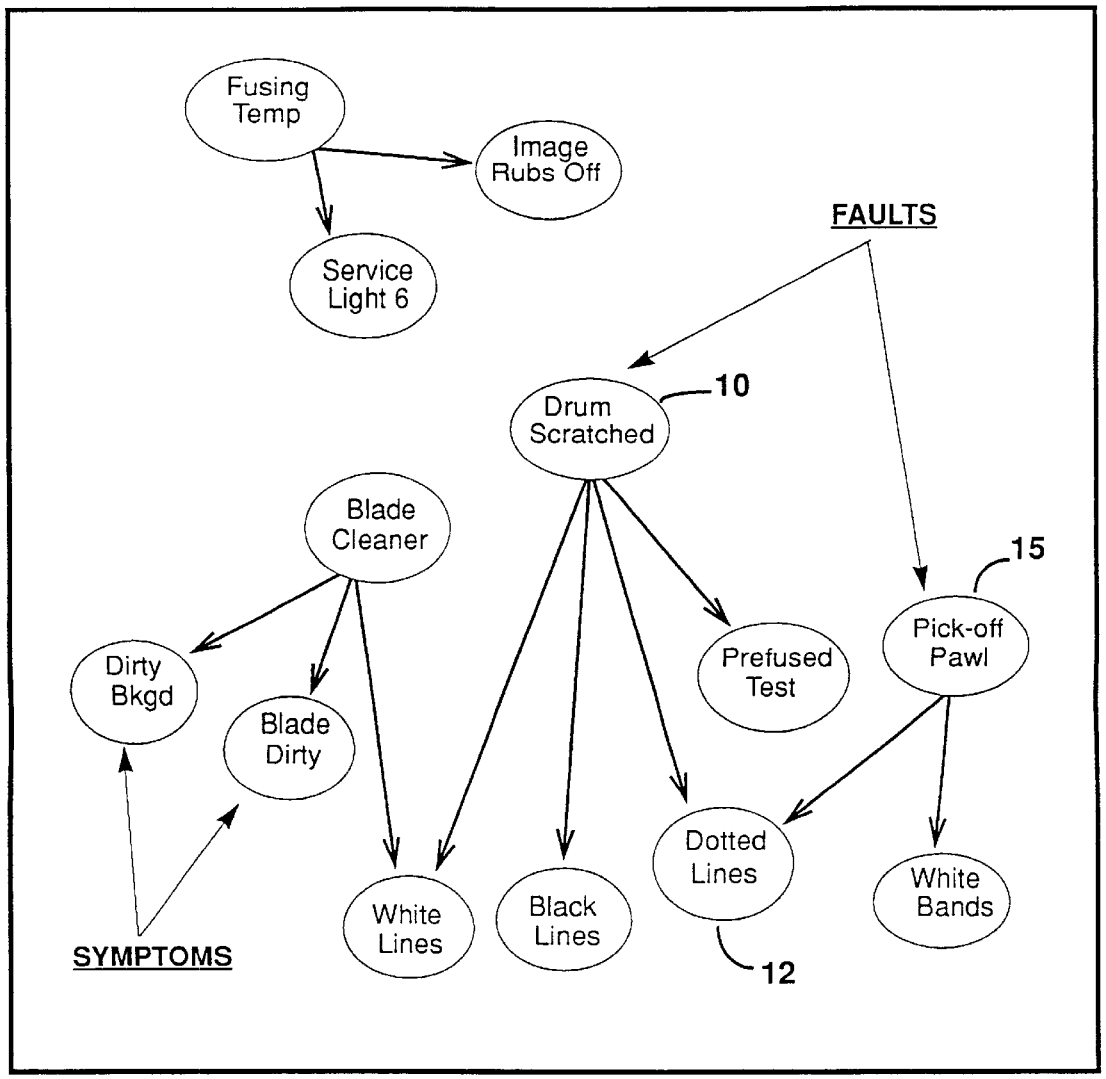
FIG. 2 is a chart illustrating a sample belief network which interrelates faults and symptoms in a system.

FIG. 2 is a diagram illustrating a typical relationship of faults and symptoms. For illustration, the faults and symptoms chosen relate to a photocopier repair/adjustment context, such as might be employed in conjunction with the system of our invention. As shown in FIG. 2, each fault can be related to more than one symptom, and each symptom to more than one fault. For example, the fault of a scratched drum 10 can cause many different symptoms, including dotted lines 12. Dotted lines, however, can also be caused by a faulty pick-off pawl 15. Of course, only a few faults and a few symptoms are shown in FIG. 2. An actual belief network will be much larger than that shown in FIG. 2, often including hundreds of faults and symptoms interrelated in a complex arrangement.

The structure of FIG. 2 in the larger system is developed by discussion between the expert and the software developer. At that time individual probabilities are assigned to the relationships which exist between each individual symptom and all faults. For example, the expert and software developer may decide that when dotted lines 12 occur, there is a one-third probability that it is due to a faulty pick-off pawl 15 and a two-thirds probability that it is due to a scratched drum 10. These probabilistic assessments are used in our information retrieval system to identify faults and symptoms, and provide resulting documentation to system users.

During a diagnostic session, the user enters observed symptoms into the expert system, thus making the symptoms active for the current session. As a result, in a manner described below, technical documentation pertaining to these symptoms becomes available for the user to browse through. The faults supported by these symptoms, that is, the faults which cause these symptoms to occur, also become active when there is enough justification, via the observed symptoms, to promote their individual likelihoods. When this occurs, technical documentation for the individual faults is also made available.

By recommending only the technical documentation pertaining to the active symptoms and faults, the system provides only the most relevant textual information of the current context of the diagnostic session. All other documentation is available for the user to browse through, but not recommended by the system. We also provide a method of offering a more context-specific set of documentation for individual active faults by intersecting the topics from the supporting symptoms (i.e., the symptoms which have helped increase an individual fault's likelihood) and the fault. The result is a set of topics more specific in their depiction of the current diagnosis.

By exploiting the belief network system at development time, we are able to use the content of the network to locate relevant documentation to be offered at runtime. At runtime, we take advantage of the active nodes and their alliances to provide more relevant documentation at the appropriate stages during a diagnostic session.

Although other methods can be used, we retrieve the appropriate information based on the user manual table of contents method. This method is described in detail in commonly assigned copending U.S. patent application Ser. No. 07/988,729, entitled "Method and Apparatus for Semantic Pattern Matching for Text Retrieval." The table of contents method has several advantages over comparable systems. First, the table of contents system uses natural language understanding techniques and a unique method of propagating the context of topics to provide a better search strategy in user manual texts. Second, our system provides the user with a structured set of fundamental manual topics which relate both to the individual concepts active in the expert system and to the combined context of concepts addressing the same diagnostic goal. As a result, the content of the information available is richer and more useful to the user. Lastly, the probabilistic approach provides a natural method of evaluating what is currently important in the system and what observed items support those important concepts. Because of this, our system offers a more complete and reliable set of documentation to support the current diagnosis.

Although other types of natural language understanding systems may seem to be better solutions to interfacing with computers, other systems have definite limitations which inhibit their overall functionality. Such types of natural language understanding technology have not matured enough to be an effective tool in the electronic servicing field where small, inexpensive computers are still a requirement. The table of contents system upon which we rely provides an interface for entering and searching for relevant information in a user manual domain. Of course, although we prefer the table of contents approach, either type of system could be used in accordance with our invention, particularly as the natural language technology advances.

Our information retrieval system uses input from the belief network environment. Because the belief network is generated by experts and developers as they construct individual nodes, our system provides a controlled input scheme where experts and developers (familiar with the technical documentation) create the actual English search patterns. The developers are also responsible for making use of the table of contents database which consists of all relevant topics from the user manual, typically depicted by the original table of contents of the user manual. The database is then converted, using well known techniques and a natural language understanding system, into a semantically defined database, where each topic is in the form of a semantic representation, enabling searching for semantic similarities.

The benefits of simplifying how our system is used in this environment are several. First, our system eliminates the user having to construct a query and the system having to understand it. Typically, the user of our system never stops to enter a query. The appropriate query has already been constructed and parsed, and the relevant information retrieved. Second, our system eliminates the parse failures which commonly occur when users attempt to construct queries directly. Our system never has to deal with "novel" queries because of the control utilized at development time over how to properly construct an input sequence. Finally, our system simplifies the process of matching queries and table of contents topics. Because the system is well defined in terms of how topics and queries are parsed and represented, the matching becomes simpler.

In addition to furnishing the user with query-free information retrieval, our system provides a method of browsing the user documentation such as the table of contents or relevant subsections. Thus, the user is equipped with the appropriate tools for locating and using the online technical documentation.

As an example of how our system operates in the field, consider how an expert information retrieval system could be used by a photocopier field service technician: A copier technician has connected his laptop computer to a customer's copier. The customer has complained of streaky black lines appearing on all copies made recently. The technician loads the copier diagnostics program and starts to enter, by selecting from a menu, the known symptoms the copier has displayed. As he enters the first few symptoms, the system notifies him of the documentation available based upon both the symptoms and the most probable faults. The technician immediately pursues the documentation on the leading fault candidate to determine if there is any additional information which may confirm or discount this fault. He also views the documentation of an observed symptom knowing that it can be caused by several different faults and not just the leading fault candidate. In effect the user has invoked a query-free information database (a computational resource) without directly requesting such.

In the preceding example, the technician is provided with an interface to an expert's knowledge of copiers as well as technical documentation, which supplements the overall capability of the expert system. Furthermore, the documentation is provided automatically for the technician, without him having to ask the system for additional information. The system knows the current context of the diagnoses and simply responds with the appropriate documentation.

The concept of providing query-free information retrieval in any domain is a favorable solution to dealing with query languages, natural or otherwise, which either fail to fully represent a query goal or fail in their ability to handle complex query statements. Our system provides relevant documentation for the current context without the user having to formulate a query and wait for the results. To simplify the process of creating node labels used as search patterns, we take advantage of the structure of the expert system which is usually closely related to the documentation used to describe the domain. Thus, we benefit from the structure of the expert system by providing contextual pointers to relevant user manual information.

An expert system typically consists of two major software environments: the development and runtime environments. During development, we extract the belief network information, such as shown in FIG. 2, from the Dxpress development program and process it through an information retrieval system. The information retrieval system uses the information from within each node to form a pattern for searching user manual documentation. The results of the search are a set of topics which relate to the contents of the node.

Figure 3:
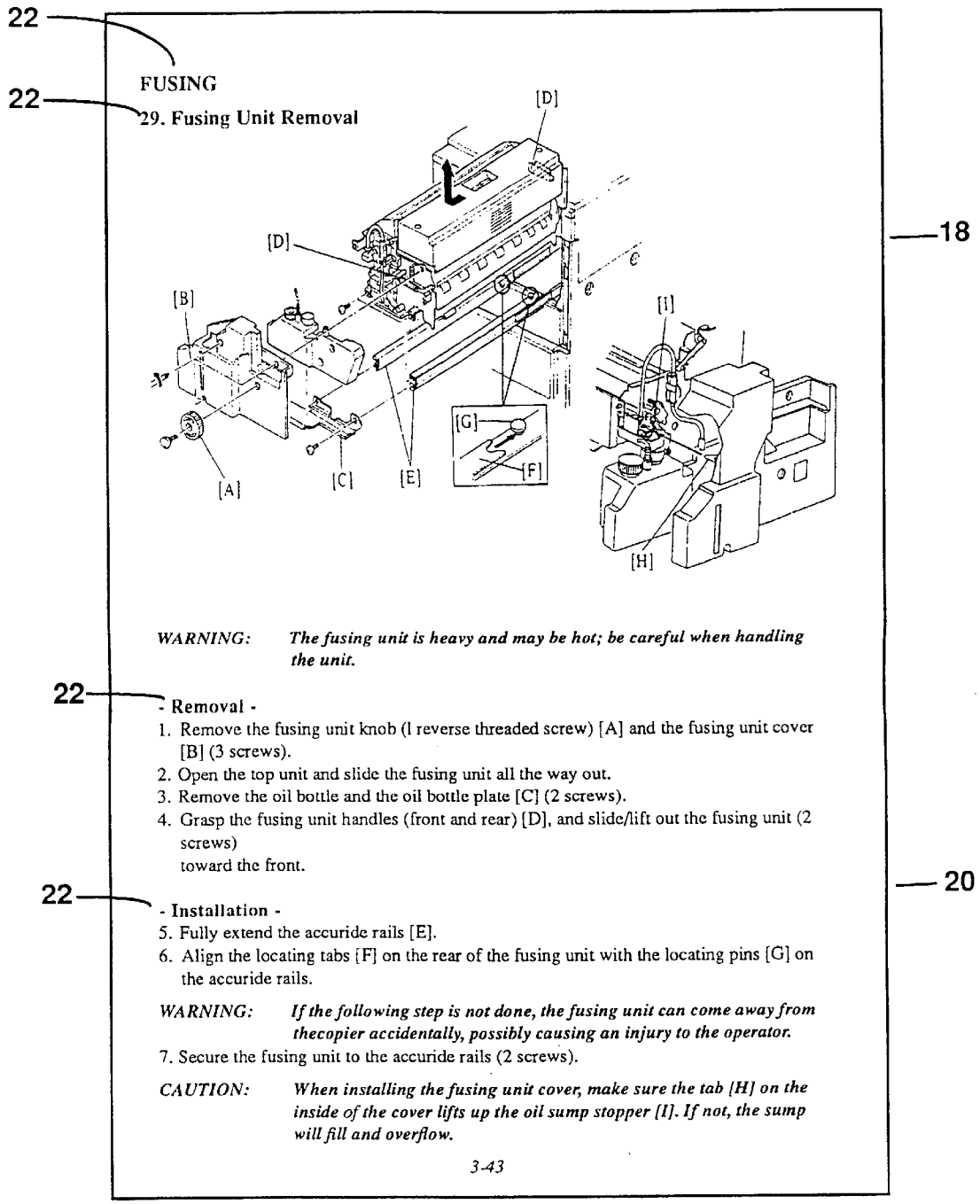
FIG. 3 illustrates typical user manual documentation, for example, for removal of a fusing unit in a photocopier.

FIG. 3 is an example of user manual documentation. As shown in FIG. 3, a typical user manual includes drawings, such as in the upper portion 18 of FIG. 3 and text such as in the lower portion 20 of FIG. 3. The topical information shown in FIG. 3 is used for information retrieval as described below. Both the drawings and the descriptive text include topics 22.

Pointers to the topics 22 then are stored as part of the structure of the node. This is performed off-line, without time delay to the end-user. Because developers and experts are the only users of the development system, they are responsible for conducting the network maintenance manual searches. The end-user does not have to wait for the system to search for relevant topics 22 because the task has been completed before the runtime system is built. This exceptional characteristic means that there is a minimal runtime cost associated with having the information retrieval system coexisting with an expert system, which is important because of the complexity of some large knowledge bases.

Figure 4:
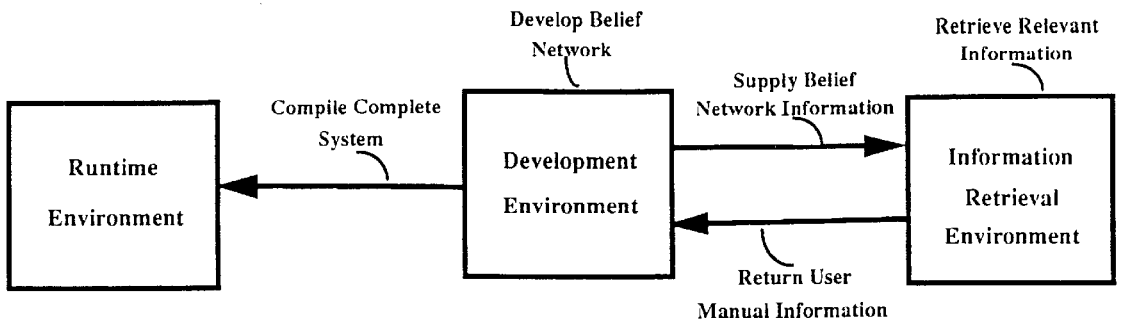
FIG. 4 illustrates the method employed to initially configure the computer system for the system described herein.

FIG. 4 is a diagram illustrating the overall development of our system, and represents the system at a high level. As shown in FIG. 4, the initial step in development of a system according to our invention is the establishment of a belief network. The establishment of this network has been discussed above in conjunction with FIG. 2. Once established, the information is transferred to an information retrieval system where relevant topics can be retrieved in the form of user manual information. Once that information is identified, the complete system is compiled to establish all of the relationships among the faults, symptoms, and user manuals. The resulting runtime environment is then available to a user of this system.

After establishing pointers from belief network nodes to user manual documentation, our system provides an intelligent method of presenting the documentation at the appropriate time during a diagnostic session. For instance, if the current expert system context is "Drum Damage," then we do not want the system to recommend documentation on the "Transfer Corona." The solution to this problem is to evaluate what nodes are currently important and only offer their documentation to the user. This is described below.

In the runtime environment, the information found by the information retrieval system is made available differently for the symptoms than for the faults. As symptoms are entered by a user, the documentation found by the information retrieval system is made available to the user on request. For instance, if a user enters a symptom into the system and supplemental documentation is available for this symptom, an icon appears next to the symptom (in the list of observed symptoms) denoting the availability of documentation. The user may also request to view the documentation of an unobserved (uninstantiated) symptom. This is done, for instance, in cases where the user requires additional information about a symptom prior to instantiation.

Determining when to provide the supplemental fault documentation is more difficult. Faults in the runtime system are presented as a ranked list based on their individual conditional probabilities given all symptoms observed thus far. Because the top contenders appear at the top of the list, the user is able to distinguish between the real contenders and the low probability faults which have little significance under the current set of circumstances. It is for this reason that our system targets only the top contenders to provide automatic documentation for the faults.

We define an activation predicate (AP) by which the system decides whether a fault is part of the "active" set of top contenders. The predicate is designed to locate the current set of top fault contenders. These contenders can change after each instantiation of new symptoms. In the belief network system, the combined sum of fault probabilities is always 1.0. Thus, each time a new symptom is recorded, the faults which have a strong relationship with this symptom will increase in likelihood. When their values increase, other fault values decrease so that all fault probabilities continue to sum to 1.0.

Each fault can have a positive, negative or neutral reaction. The positive reaction to the instantiation of a new symptom defines support by the symptom for the fault. A negative reaction typically defines non-support, but may not take the fault out of contention. For most systems, the neutral reaction is the most typical reaction because of the number of faults and their association with that symptom: the most likely situation is that only a few faults have a significant relationship with an individual symptom. Essentially, the activation predicate eliminates irrelevant faults by using a threshold value of 0.03 (or other desired value). All faults having a probability of 0.03 or greater are considered top contenders. These contenders are the only faults which will signal the user that documentation is available. Of course, other criteria could readily be used in place of a fixed threshold.

Thus far, we have discussed providing user manual documentation for individual nodes, not taking into account possible relationships in the documentation between fault and symptom nodes. In fact, the nodes which do "intersect" in the user manual documentation are considered the primary objective because an intersection defines a richer description of the current expert system context—the context between that of a diagnostic session in which, for instance, a symptom and a fault both share a common topic. The user likely will find the content of this information more relevant than information describing only individual nodes.

For example, assume a situation exists where there are four observed symptoms and five top contender faults. The most relevant documentation would be the documentation which connects symptoms and faults, for example, fault-A connected to symptom-2. By defining a support structure which depicts the symptoms and their relative support for contender faults, the system determines which symptoms support individual faults. Thus, it can perform a simple set intersection of the topics from each node in the support structure and produce a rich set of topics with relations to more than one node. This set is called the primary topic set. We call the set of topics having only a relation to an individual node the secondary topic set.

To produce a primary topic set for a top contender fault, it is necessary to define what it means to be a member of a fault's support group. This is done by the support group predicate (SGP). The support group predicate evaluates each member of the top contender set each time a new symptom is observed. This process is very similar to that of taking a before-and-after snapshot of the entire fault set. The after fault "snapshot" is compared to the before fault "snapshot" and differences noted by examining which faults were most directly influenced by the new observable. In other words, those faults which had the strongest reactions to the new observable are determined.

The support group predicate is based on a $\Delta P_{ij}$ matrix. The $\Delta P_{ij}$ matrix represents the difference between the probability of each fault before and after a new symptom was entered. If the difference is significant enough, then there is a correlation between the symptom and the fault (a reaction). The diagram below defines $\Delta P_{ij}$ and the resulting matrix. The symptoms represented are only those symptoms which are active for the current session. These are the only nodes evaluated when measuring the strength of support, nonsupport or neutrality at each instantiation.

$F=(F_1, \ldots, F_m)$ is the set of all active faults. $S=(S_1, \ldots, S_j)$ is the set of all active symptoms, and $\alpha$=support group threshold is the desired threshold. For $F_i$ in F, our goal is to find $\Delta P_{ij}$ where $S_j$ is the latest observed symptom $\Delta P_{ij}=P(F_i|S_1, \ldots, S_j)-P(F_i|S_1, \ldots, S_j)$. If $\Delta P_{ij}>\alpha$, then ADD $S_j$ to the $F_i$ support group $SG_i$. (Preferably, we set $\alpha$=0.01.)

$\Delta P_{ij}$ Matrix

Observed Symptoms $$\text{Faults} \begin{array}{c} \\ F_1 \\ F_2 \\ \ldots \\ F_i \\ \ldots \\ F_m \end{array} \begin{bmatrix} S_1, & S_2, & \ldots, & S_j \\ & & & \\ & & & \\ & \vdots & & \\ & \ldots & \Delta P_{ij} & \\ & & & \\ & & & \end{bmatrix}$$

Figure 5:
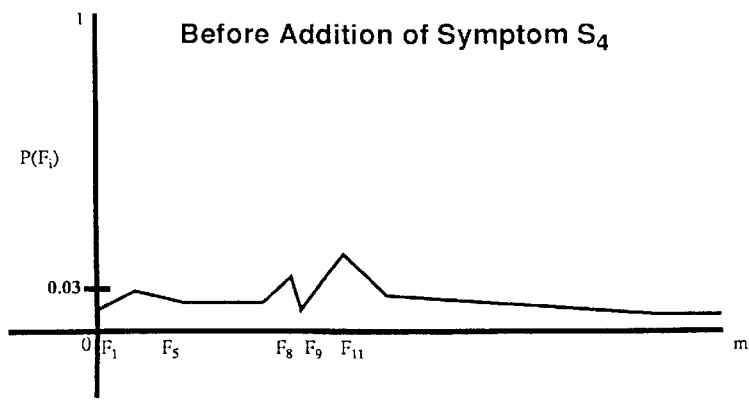
FIG. 5 is a graph illustrate the probability of various faults with the apparatus being investigated before introduction of a new symptom.

FIG. 5 is a graph which illustrates the individual probabilities of a series of faults based upon a set of symptoms entered into our system at a given time. Note that the sum of the probabilities of all faults must be 1.0. At the instant of the graph in FIG. 5, faults $F_8$ and $F_{11}$ are the top two contending faults as being likely to have caused the symptoms entered into the system up to that time.

Figure 6:
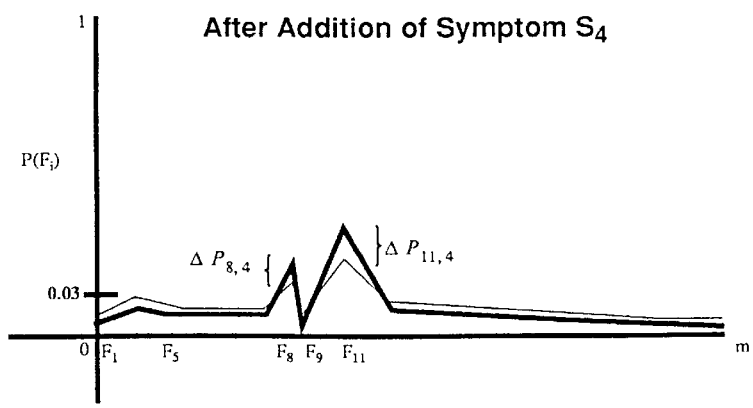
FIG. 6 is a chart illustrating the change in probabilities after introduction of a new symptom.

FIG. 6 illustrates what occurs after an additional symptom $S_4$ is entered into the system. The addition of symptom $S_4$ increases the probabilities of $F_8$ and $F_{11}$ while decreasing the probabilities of all other faults, yet retaining a sum of 1.0. This represents an example of how the $\Delta P_{ij}$ (snapshot) method evaluates the results of introduction of a new symptom. Notice the increase in probability in faults $F_8$ and $F_{11}$. As their value increases, the value of the other, less relevant, faults decreases. The $\Delta P_{ij}$ represents the gap between the previous fault probability value and the value after $S_4$ has been observed.

If it is decided that a fault has been influenced (either positively or negatively) by the new symptom, then the symptom becomes a member of the fault's support group. After each new symptom instantiation, all modified support groups are evaluated, producing a new set of primary topics for the user to view in the manner explained below.

Figure 7:
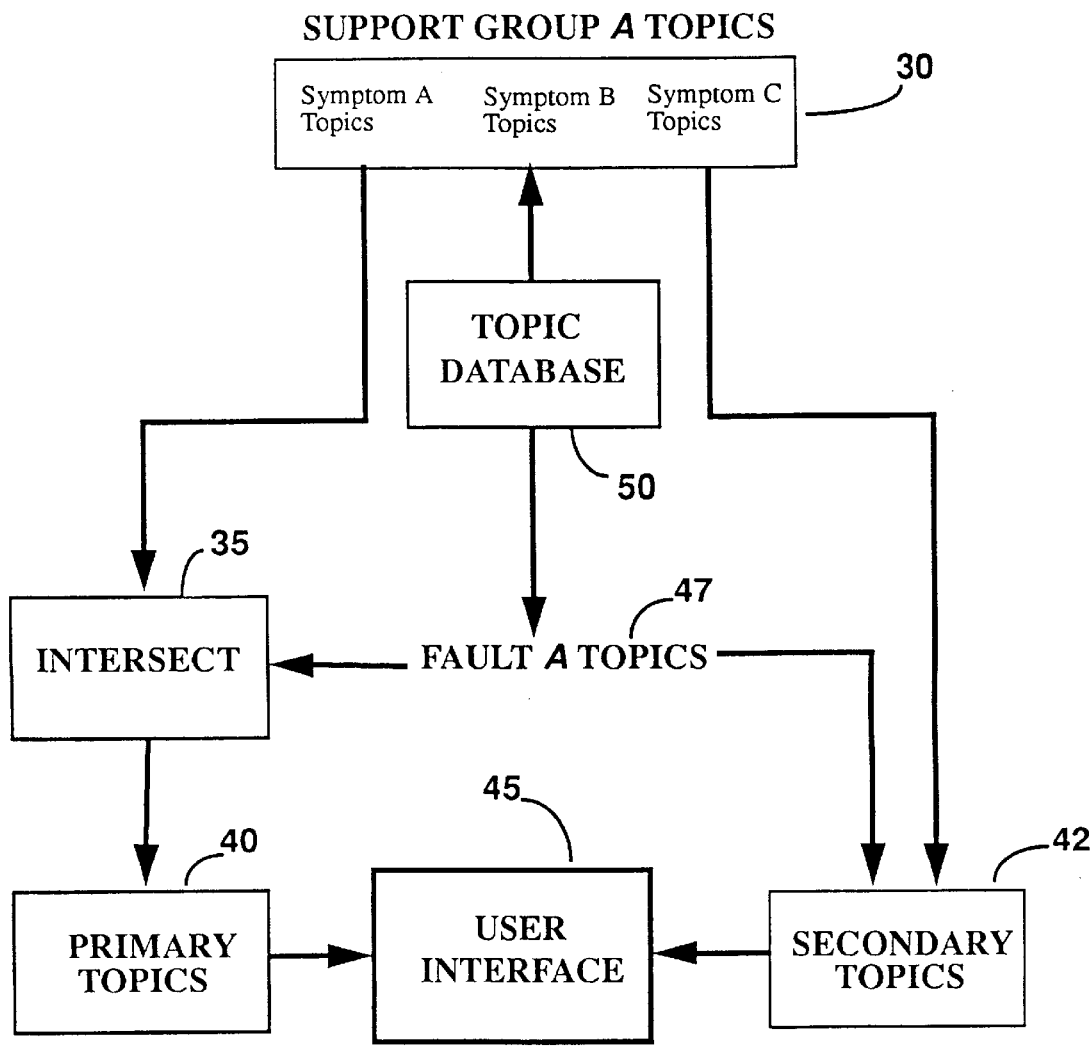
FIG. 7 is a flow chart illustrating the relationship of primary and secondary topics.

FIG. 7 is a chart displaying the operation of our system with respect to primary and secondary topics. As shown in FIG. 7, symptoms A, B and C have been entered 30. These symptoms have been entered through the user interface in a manner which is described below. The symptoms, for the sake of this example, are members of a particular fault's support group (fault A), in the sense of being related to each other as described in conjunction with FIGS. 5 and 6. As a result, the symptoms intersect 35 to establish primary topics 40 which are likely of most interest to the user. Where the symptoms do not so relate to each other as being within a given fault support group, secondary topics 42 occur which are less well-focused than the primary topics but are still of interest to the user, and are available to the user. In response to this information, the user may employ the user interface 45 to select documentation on the primary or secondary fault A topics 47 available from the topic database 50.

Figure 8:
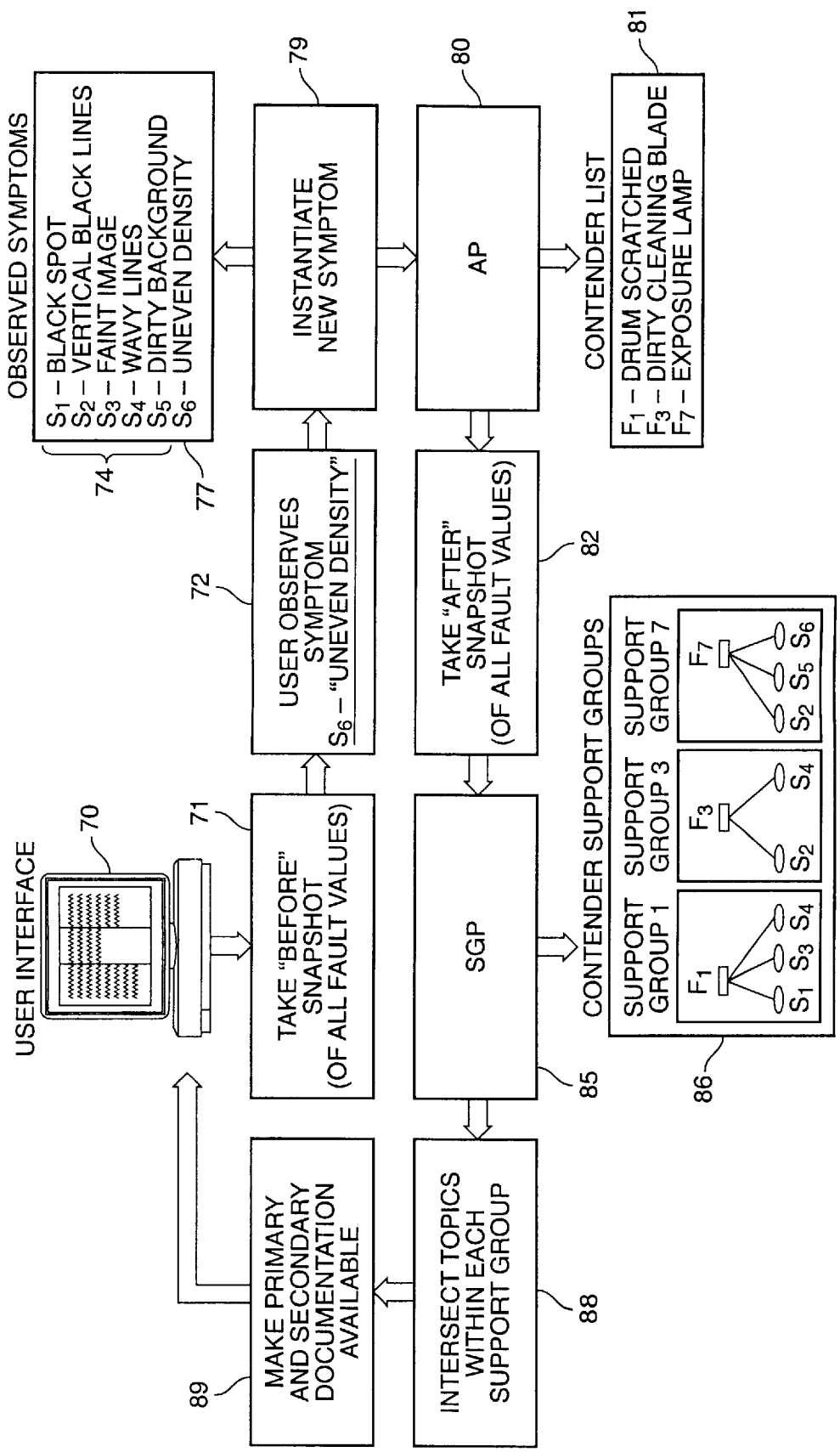
FIG. 8 is a chart depicting the process of determining support groups and a top contenders list.

FIG. 8 is a diagram illustrating how both the activation predicate and the support group predicate fit into the existing runtime environment to provide automatic documentation recommendations. In FIG. 8, the dark arrows represent flow and the open arrows represent output from the system. The figure illustrates how through the user interface 70 a "before" snapshot 71 is presented of all fault values prior to the entry of the newest symptom 72. In the case of FIG. 8, the previous symptoms 74 consist of symptoms $S_1$ through $S_5$ which have been observed. The probabilistic information for these symptoms is presented in the manner described above.

Next, the user observes the new symptom 77, for example, uneven copy density, termed symptom $S_6$. The instantiation 79 of this new symptom is added to the list of observed symptoms 74 and transferred to the activation predicate 80. The activation predicate 80 maintains the contender list 81 of the most likely faults to cause the observed symptoms. It also provides an "after" snapshot 82 of all fault values. These values are used by the support group predicate 85 to maintain contender support groups 86 and to intersect the topics 88 within each support group thereby to make primary and secondary documentation 89 available through the user interface.

Figure 9:
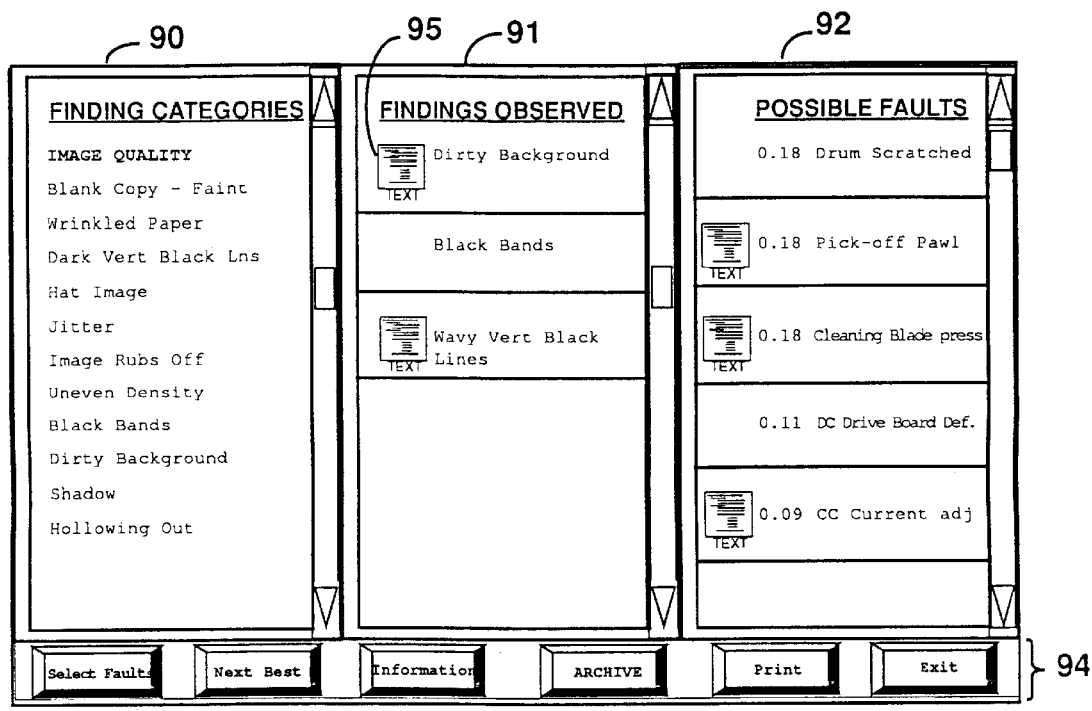
FIG. 9 is a drawing illustrating a typical user interface.

FIG. 9 is a diagram depicting a preferred embodiment of the user interface of our system. The user interface, in this embodiment, includes three windows 90, 91 and 92, one 90 relating to categories of possible findings by the user, one 91 relating to the user's observations, and one 92 listing the leading fault candidates based upon the probabilities established in the belief network. The first window represents the symptoms available in this category for the user to select. The middle window 91 represents the observed symptoms. In the last window 92 is the list of faults and their current probabilities based on all symptoms entered. Also provided are a series of graphical "push buttons" 94 to enable the user to select other menus or screens where textural or descriptive information is available, that fact is indicated by an icon 95 which the user may select.

Figure 10:
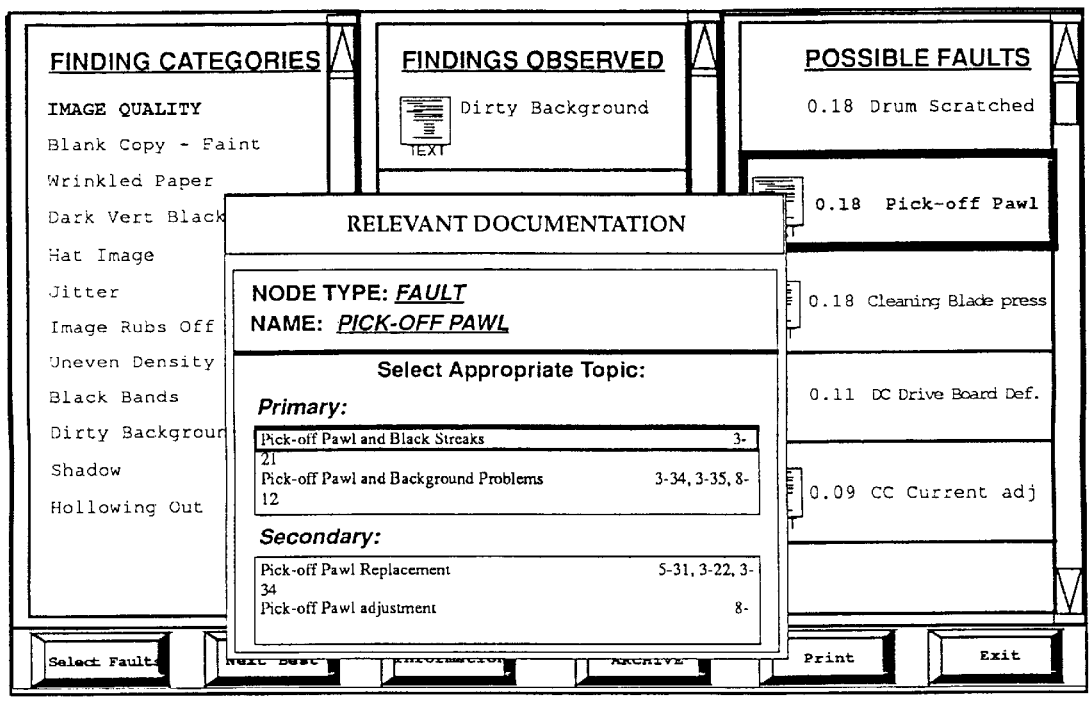
FIG. 10 is a drawing illustrating the selection of primary or secondary information.

FIG. 10 depicts a situation where the user has asked, for example, by "clicking" on the box marked text, to view the documentation for the Pick-off Pawl fault. As shown, the user is presented with lists of both the primary and secondary topics. Once the user has decided which topic to view (e.g., "Pick-off Pawl Replacement"), the user interface provides a way of browsing from this point of contact. That is, the relevant topic is simply an entry point into the documentation based on a specific content. From there, the user typically will browse in the surrounding textual or illustrative areas searching for key information. (Typical documentation is shown in FIG. 3.)

Figure 11:
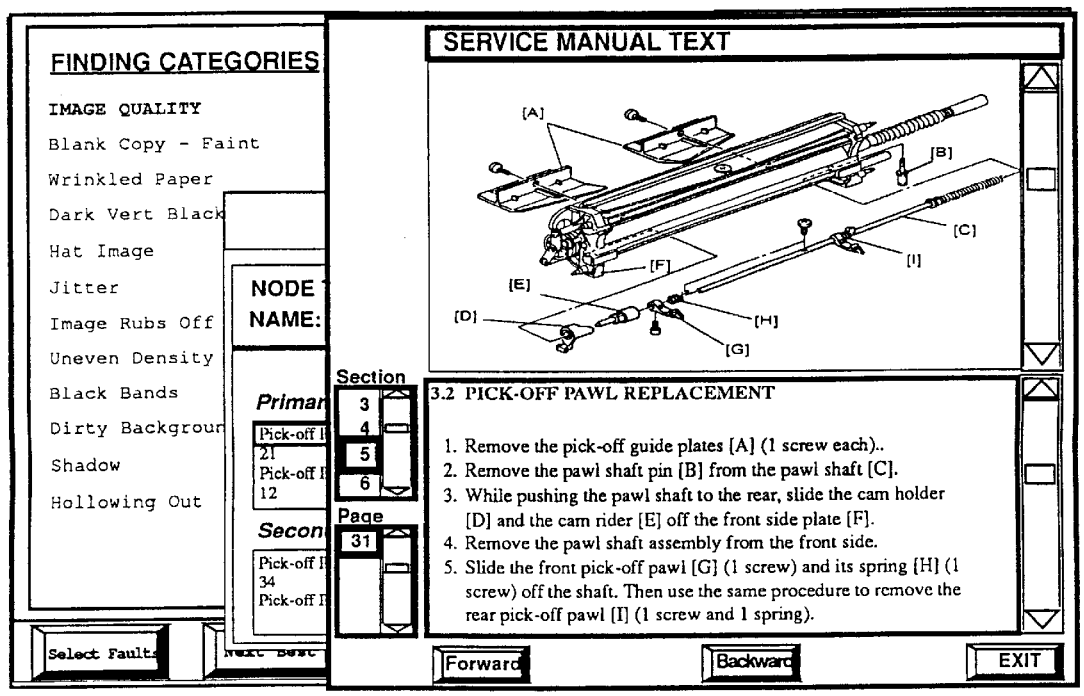
FIG. 11 is a drawing illustrating the display of on-line technical information.

FIG. 11 illustrates the user interface provided for the user to actively browse through the documentation once a point of entry is established.

We have discussed an information retrieval system which operates in parallel with a probabilistic expert system, providing query-free technical documentation as an "automatic" side-effect of a diagnostic session. The system derives its search goals from the information embedded in the expert system. Thus, our system takes advantage of an expert's knowledge in two ways: as the primary source for constructing a knowledge base, and as a provider of contextually sensitive node labels which can later be used to search technical documentation. As experts become more and more familiar with the documentation and its creation, particularly if standard methods of expression are used, the experts can provide better descriptive labels for the expert system nodes, which in turn become search patterns, thus increasing the likelihood of retrieval success. Furthermore, the actual computationally intensive task of searching on-line text is eliminated from the runtime system by performing the action off-line, during development time. These characteristics, which provide simple solutions yet exhibit high quality results, provide an improved system for information retrieval.

The above description of the preferred embodiment has been made to explain the invention. Although particular examples such as repair of a photocopy machine have been described, it should be appreciated these examples are only for illustration and explanation. The scope of the invention is defined by the following claims.

We claim:

1. A system for dynamically invoking a computational resource for a user comprising:
    means for operating for the user a base application such that the computational resource is external to the base application;
    means for receiving into the base application a series of user interactions which establish a context; and
    means for in response to the series of user interactions dynamically instructing, responsive to the context, the computational resource to perform selected computational operations, said system integrated within a single computer.

2. The system of claim 1 wherein said single computer is a laptop.

3. A system as in claim 1 wherein the computational resource comprises a computing system having an information retrieval system.

4. A system as in claim 3 wherein the computational resource further comprises a database system.

5. A system as in claim 1 wherein the means for operating for the user a base application comprises an expert system.

6. A system as in claim 5 wherein the expert system further comprises a belief network.

7. A system as in claim 1 wherein the means for receiving into the base application a series of user interactions which establish a context comprises a data entry device.

8. A system as in claim 1 wherein the means for instructing the computational resource in response to the series of user interactions comprises means for displaying the availability of information to the user.

9. In a data processing system, a method for dynamically generating a result responsive to a series of user interactions, said method comprising:
    operating a base application and a computational resource external to the base application using a single computer;
    receiving, using the base application, the series of user interactions;
    monitoring a context defined by the series of user interactions;
    dynamically constructing an instruction to the computational resource responsive to the context;
    executing, using the computational resource, the instruction to generate a result; and
    displaying the result.

10. The method of claim 9 wherein said computational resource comprises an information retrieval system and said executing the instruction comprises retrieving an indication of the availability of information.

11. The method of claim 9 wherein said computational resource comprises a database system and said executing the instruction comprises accessing a database.

12. The method of claim 9 wherein said dynamically constructing an instruction comprises formulating a query responsive to the context.

13. The method of claim 9 wherein operating the base application comprises operating an expert system.

14. The method of claim 13 wherein operating the base application further comprises operating a belief network.

15. The method of claim 13 wherein said computational resource comprises an information retrieval system and said executing the instruction comprises retrieving an indication of availability of information.

16. The method of claim 15 wherein:
    said receiving a series of user interactions comprises receiving entries of symptoms about a condition; and
    said retrieved indication of availability refers to information about the condition.

17. The method of claim 16 wherein the expert system includes probabilistic information relating to individual symptoms to the condition which causes those symptoms; and wherein said executing the instruction further comprises retrieving documentation about the condition.

18. In a data processing system, a method for accessing information, said method comprising:
    operating a base application that receives a sequence of user inputs;
    operating a computational resource external to the base application;
    monitoring a context defined by the sequence of user inputs to the base application;
    dynamically constructing a query to the computational resource responsive to the context;
    searching with the computational resource, using the query, for information relevant to the context.

19. A method for dynamically invoking a computational resource on a computer comprising:
    operating on the computer a base application external to the computational resource;
    receiving into the base application a series of user interactions which establish a context; and
    dynamically instructing in response to the series of user interactions, responsive to the context, the computational resource to perform selected computational operations; wherein said base application and said computational resource external to the base application reside in a single computer.

20. A method as in claim 19 wherein said dynamically instructing comprises instructing an information retrieval system.

21. A method as in claim 19 wherein said dynamically instructing comprises instructing a database system.

22. A method as in claim 19 wherein said operating comprises operating an expert system.

23. A method as in claim 19 wherein said operating further comprises operating a belief network.

24. A computer system comprising:
    a memory;
    a display;
    a processor, connected to the memory and the display by a bus, the processor operatively disposed to:
    operate a base application and a computational resource external to the base application;
    receive using the base application, a series of user interactions;
    monitor a context defined by the series of user interactions;
    dynamically construct an instruction to the computational resource responsive to the context;
    execute, using the computational resource, the instruction to generate a result; and
    display the result.

25. The computer system of claim 24 wherein said computer system is a laptop computer.

26. A system for dynamically invoking a computational resource for a user comprising:
    means for operating for the user a base application such that the computational resource is external to the base application;

means for receiving into the base application a series of user interactions which establish a context; and means for in response to the series of user interactions dynamically instructing, responsive to the context, the computational resource to perform selected computational operations, said means for dynamically instructing employing a belief network, said system embodied within a single computer.

27. In a data processing system, a method for accessing information comprising:

operating a base application that receives a sequence of user inputs;

operating a computational resource external to the base application;

monitoring a context defined by the sequence of user inputs to the base application;

dynamically constructing a query to the computational resource responsive to the context using a belief network;

searching with the computational resource, using the query, for information relevant to the context; and displaying information discovered in said searching.

28. A computer-readable storage medium storing software for dynamically invoking a computational resource for a user, said software comprising:

a base application receiving a sequence of user interactions;

said computational resource, wherein said computational resource comprises an information retrieval system; and software for, in response to a context established by said series of user interactions, dynamically instructing the computational resource to perform selected computational operations.

29. The computer-readable storage medium of claim 28 wherein said computational resource stores established links between contexts and sequences of user interactions.

30. A computer-readable medium storing software for dynamically invoking a computational resource for a user, said software comprising:

a base application receiving a series of user interactions; and software for, in response to a context established by said series of user interactions, dynamically instructing a computational resource to perform selected computational operations.

31. The computer-readable medium of claim 30 wherein said computational resource stores established links between contexts and sequences of user interactions.

32. The computer-readable medium of claim 30 wherein said computational resource comprises an information retrieval system.

33. A computer-readable medium storing software for dynamically invoking a computational resource for a user, said software comprising:

software that monitors a series of user interactions with a base application and that dynamically instructs, in response to a context established by said series of user interactions, a computational resource to perform selected computational operations;

wherein said computational resource comprises an information retrieval system.

34. The computer-readable medium of claim 33 wherein said computational resource stores established links between contexts and sequences of user interactions.

35. The computer-readable medium of claim 33 wherein said computational resource comprises an information retrieval system.

36. A computer program product for dynamically invoking a computational resource for a user, said product comprising:

code that operates for the user a base application such that the computational resource is external to the base application;

code that receives into the base application a series of user interactions which establish a context;

code that, for in response to the series of user interactions, dynamically instructs, responsive to the context, the computational resource to perform selected computational operations; and a computer-readable storage medium for storing the codes.

37. The computer program product of claim 36 wherein said computational resource comprises an information retrieval system.

38. A computer program product for dynamically invoking a computational resource for a user, said product comprising:

code that operates for the user a base application such that the computational resource is external to the base application;

code that receives into the base application a series of user interactions which establish a context;

code that, in response to the series of user interactions, dynamically instructs, responsive to the context, the computational resource to perform selected computational operations; and a computer-readable storage medium for loading said codes into a computer.

39. The computer program product of claim 38 wherein said computational resource comprises an information retrieval system.

40. The computer program product of claim 39 wherein said code that dynamically instructs comprises code for formulating a query to said information retrieval system.

41. A computer system comprising a computer-readable storage medium for storing software for dynamically invoking a computational resource for a user, said software comprising:

a base application receiving a sequence of user interactions;

said computational resource, wherein said computational resource comprises an information retrieval system; and software for, in response to a context established by said series of user interactions, dynamically instructing the computational resource to perform selected computational operations.

42. A computer system comprising a computer-readable medium storing software for dynamically invoking a computational resource for a user said software comprising:

a base application receiving a series of user interactions; and software for, in response to a context established by said series of user interactions, dynamically instructing a computational resource to perform selected computational operations.

43. The computer system of claim 42 wherein said computational resource comprises an information retrieval system.

44. A computer system comprising a computer-readable medium storing software for dynamically invoking a computational resource for a user, said software comprising:

software that monitors a series of user interactions with a base application and that dynamically instructs, in response to a context established by said series of user interactions, a computational resource to perform selected computational operations; and wherein said computational resource comprises an information retrieval system.

* * * * *